(12) United States Patent
Jung

(10) Patent No.: US 11,093,003 B2
(45) Date of Patent: Aug. 17, 2021

(54) DISPLAY DEVICE AND DRIVING METHOD THEREOF

(71) Applicant: SAMSUNG DISPLAY CO., LTD., Yongin-si (KR)

(72) Inventor: Sung Gon Jung, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 16/816,819

(22) Filed: Mar. 12, 2020

(65) Prior Publication Data

US 2020/0326752 A1 Oct. 15, 2020

(30) Foreign Application Priority Data

Apr. 12, 2019 (KR) .................. 10-2019-0043248

(51) Int. Cl.
*G06F 1/16* (2006.01)
*G06F 3/14* (2006.01)

(52) U.S. Cl.
CPC .......... *G06F 1/1652* (2013.01); *G06F 1/1626* (2013.01); *G06F 1/1641* (2013.01); *G06F 3/1431* (2013.01)

(58) Field of Classification Search
CPC .... G06F 1/1652; G06F 3/1431; G06F 1/1626; G06F 1/1641
See application file for complete search history.

(56) References Cited

U.S. PATENT DOCUMENTS

| 10,062,362 | B2 | 8/2018 | Kwak et al. |
| 10,705,573 | B2* | 7/2020 | Tan ............. H01L 27/3225 |
| 2013/0215041 | A1* | 8/2013 | Kim ............. G06F 3/0346 345/173 |
| 2014/0098095 | A1* | 4/2014 | Lee ............. G09G 3/003 345/420 |

(Continued)

FOREIGN PATENT DOCUMENTS

| KR | 100640750 B1 | 10/2006 |
| KR | 101063882 B1 | 9/2011 |
| KR | 1020180056062 A | 5/2018 |

OTHER PUBLICATIONS

Deccan Chronicle, Samsung foldable phone with massive curved battery rumoured, 2018, https://www.deccanchronicle.com/technology/mobiles-and-tabs/040718/samsung-foldable-phone-with-massive-curved-battery-rumoured.html, retrieved 2019.

(Continued)

*Primary Examiner* — Grant Sitta
(74) *Attorney, Agent, or Firm* — Cantor Colburn LLP

(57) ABSTRACT

A display device includes a display panel including a first display area and a second display area adjacent to each other. A processor generates a first image data corresponding to the first display area and the second display area in a first mode and generates a second image data corresponding to the first display area or the second display area in a second mode. A display driver generates a first data signal corresponding to the first image data in the first mode and generates a second data signal corresponding to the second image data in the second mode. The first display area and the second display area are alternately selected. The second data signal is provided to a selected one of the first display area and the second display area at entry time into the second mode.

18 Claims, 12 Drawing Sheets

(56) References Cited

U.S. PATENT DOCUMENTS

| | | | | |
|---|---|---|---|---|
| 2014/0118317 | A1* | 5/2014 | Song | G09G 5/14 |
| | | | | 345/204 |
| 2015/0042674 | A1* | 2/2015 | Lin | G09G 5/14 |
| | | | | 345/619 |
| 2015/0227223 | A1* | 8/2015 | Kang | G06F 1/1641 |
| | | | | 345/173 |
| 2015/0301672 | A1* | 10/2015 | Kim | G06F 3/0414 |
| | | | | 345/156 |
| 2017/0017313 | A1* | 1/2017 | Rakshit | G06F 1/1652 |
| 2017/0060189 | A1* | 3/2017 | Sohn | G06F 1/1652 |
| 2017/0177096 | A1* | 6/2017 | Cheong | G06F 3/048 |
| 2017/0185289 | A1* | 6/2017 | Kim | G06F 1/1641 |
| 2017/0221456 | A1* | 8/2017 | Kim | G09G 3/20 |
| 2017/0345365 | A1* | 11/2017 | Li | G09G 3/3225 |
| 2018/0018929 | A1* | 1/2018 | Xun | G06F 1/1626 |
| 2018/0188910 | A1 | 7/2018 | Ko et al. | |
| 2018/0204539 | A1* | 7/2018 | Yang | G06F 1/1652 |
| 2018/0356904 | A1* | 12/2018 | Disano | G06F 3/1423 |
| 2018/0366529 | A1* | 12/2018 | Lee | H01L 51/0031 |

OTHER PUBLICATIONS

Jake Kanter, This little-known Chinese company beat Samsung in launching a foldable phone- and it actually works, 2018, https://www.businessinsider.com/foldable-phone-the-royole-flexpai-launch-2018-11.

\* cited by examiner

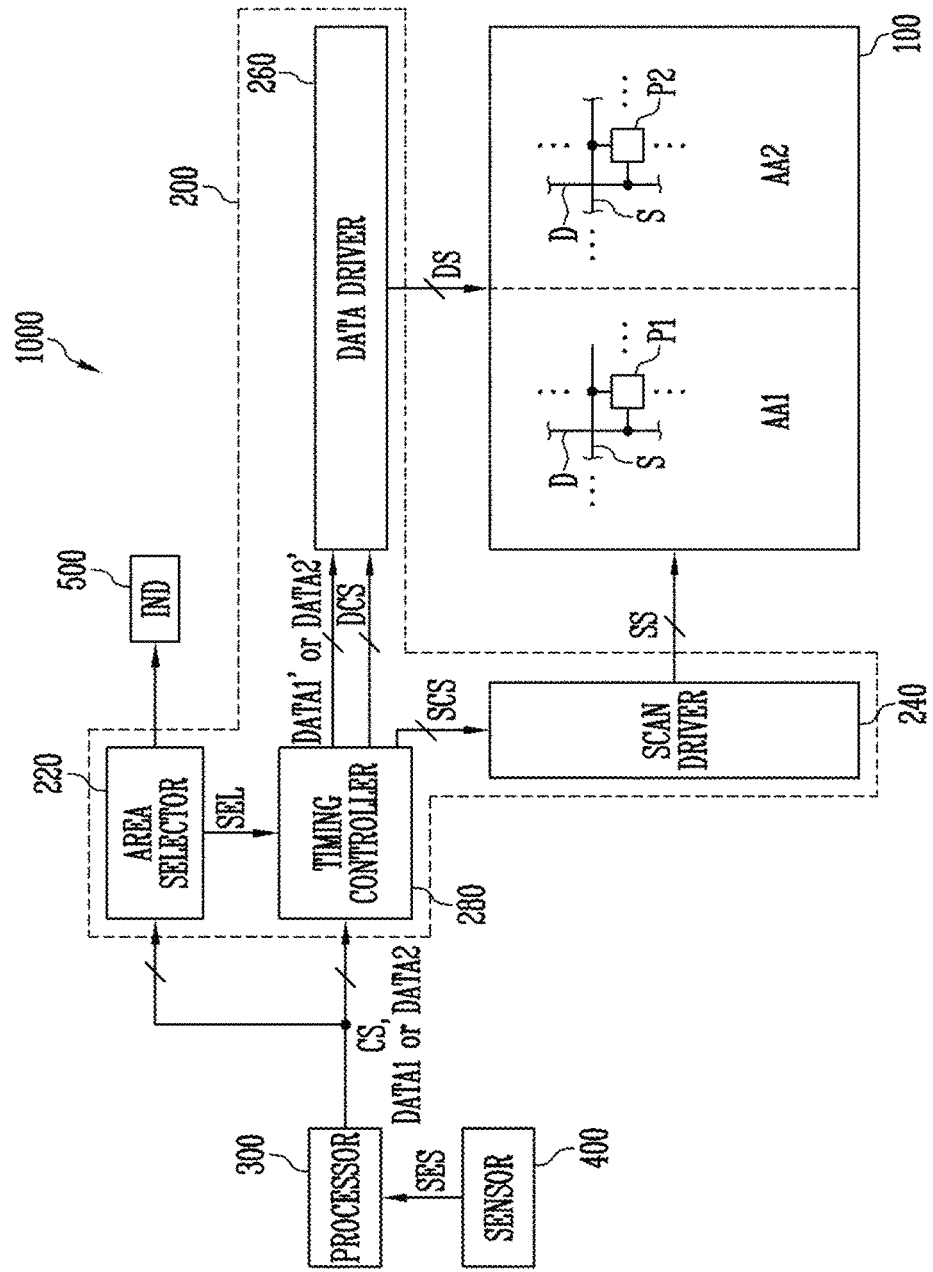

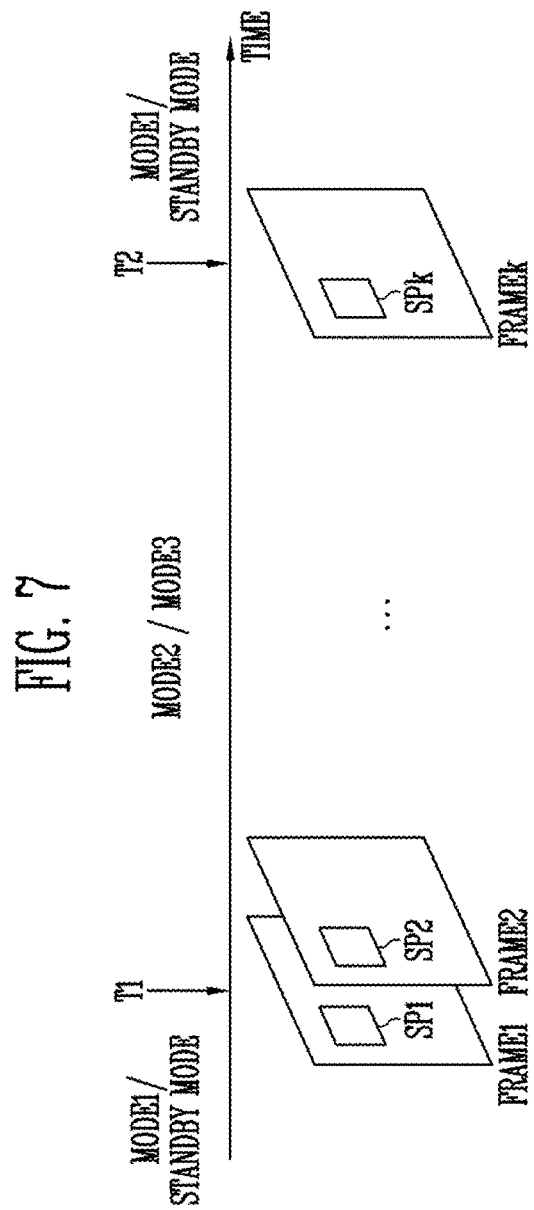

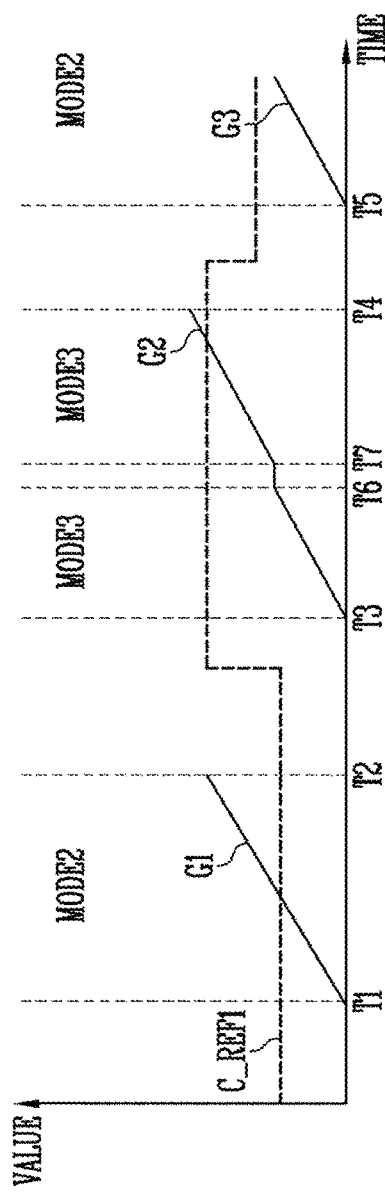
FIG. 8B
FIG. 9
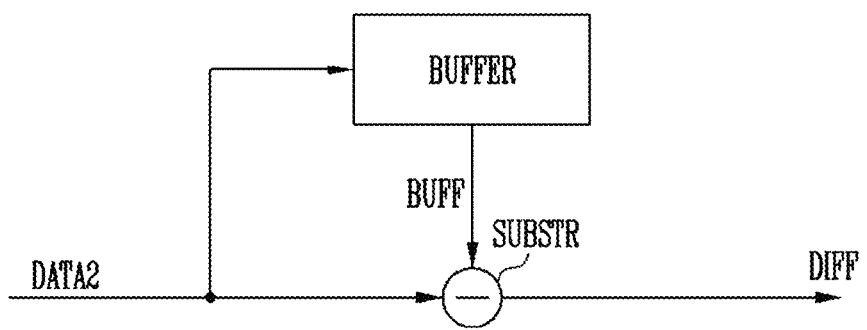

DISPLAY DEVICE AND DRIVING METHOD THEREOF

This application claims priority to Korean Patent Application No. 10-2019-0043248 filed on Apr. 12, 2019, and all the benefits accruing therefrom under 35 U.S.C. § 119, the content of which in its entirety is herein incorporated by reference.

BACKGROUND

1. Field

Exemplary embodiments of the invention relate to a display device and a driving method thereof.

2. Description of the Related Art

At least a portion of a display panel is deformable in a flexible display device such as a foldable display device or a rollable display device. Accordingly, a full display mode for displaying a valid image using an entirety of a display area and a partial display mode for displaying a valid image using only a portion of the display area are under study. Thus, a display device supporting a plurality of display modes may be efficiently operated according to a use environment, a state, or the like, thereby improving a convenience of use.

SUMMARY

When using only a partial area of a display area of a display panel in a partial display mode, a degradation of the partial area may be relatively accelerated. In this case, a quality of an image displayed through the display panel is deteriorated due to unevenness in a degree of degradation of an entirety of the display area in the full display mode, and a life-span of the display device may be shortened.

Exemplary embodiments of the invention provide a display device capable of improving an image quality and a life-span of a display device by making a degree of degradation of the display panel uniform and a driving method thereof.

An exemplary embodiment of a display device includes a display panel including a first display area and a second display area adjacent to each other, a processor which generates first image data corresponding to the first display area and the second display area in a first mode and second image data corresponding to the first display area or the second display area in a second mode, and a display driver which generates a first data signal corresponding to the first image data in the first mode and a second data signal corresponding to the second image data in the second mode, where the first display area and the second display area are alternately selected, and the second data signal is provided to a selected one of the first display area and the second display area at an entry time into the second mode.

In an exemplary embodiment of the invention, the second data signal may be provided to the selected one of the first display area and the second display area during the second mode is held continuously.

In an exemplary embodiment of the invention, the first display area and the second display area may be disposed continuously.

In an exemplary embodiment of the invention, the display panel may be a foldable display panel folded with reference to a folding axis, and the first display area and the second display area may be divided with reference to the folding axis.

In an exemplary embodiment of the invention, the display panel may be out-folded with reference to the folding axis.

In an exemplary embodiment of the invention, the processor may operate in the first mode when the display panel is unfolded, and the processor may operate in the second mode when the display panel is folded.

In an exemplary embodiment of the invention, the display panel device may further include a sensor which senses a deformation of the display panel and outputs a sensing signal.

In an exemplary embodiment of the invention, the display driver may include an image converter which generates second conversion data by arranging the second image data based on area selection information corresponding to the selected one of the first display area and the second display area in the second mode, an area selector which updates the area selection information based on the second image data or the second conversion data, and a data driver which generates the first data signal based on the first image data and generating the second data signal based on the second image data, where the area selection information may include a first setting value corresponding to the first display area and a second setting value corresponding to the second display area.

In an exemplary embodiment of the invention, the area selector may calculate accumulated data by accumulating the second image data, and may change the area selection information when an average of the accumulated data exceeds a first reference value.

In an exemplary embodiment of the invention, the area selector may accumulate some of grayscale values included in the second image data to calculate the accumulated data.

In an exemplary embodiment of the invention, the area selector may initiate the accumulated data when entering or exiting the second mode.

In an exemplary embodiment of the invention, the area selector may adjust the first reference value based on the accumulated data when entering or exiting the second mode, and the first reference value is larger as the accumulated data is larger.

In an exemplary embodiment of the invention, the area selector may change the area selection information when a temporal change of the second image data is less than a reference value.

In an exemplary embodiment of the invention, the area selector may alternately select the first setting value and the second setting value whenever entering the second mode.

In an exemplary embodiment of the invention, the area selector may generate first sub-accumulated data corresponding to the first display area and second sub-accumulated data corresponding to the second display area by accumulating the first image data and the second conversion data, and may change the area selection information based on a difference between the first sub-accumulated data and the second sub-accumulated data.

In an exemplary embodiment of the invention, the data driver may block an output of a remaining one of the first display area and the second display area.

In an exemplary embodiment of the invention, the display device may further include a first indicator corresponding to the first display area, and a second indicator corresponding to the second display area, where the first indicator may be activated when the first display area is selected, and the second indicator may be activated when the second display area is selected.

In an exemplary embodiment of the invention, each of the first indicator and the second indicator may be implemented as a lamp.

An exemplary embodiment of a driving method of a display device including a display panel that is folded with reference to a folding axis and includes a first display area and a second display area divided with reference to the folding axis includes selecting one of the first display area and the second display area when the display panel is folded includes generating conversion data by arranging image data corresponding to the selected one of the first display area and the second display area, generating a data signal based on the conversion data, and providing the data signal to the display panel.

In an exemplary embodiment of the invention, the driving method of the display device may further include updating usage information of each of the first display area and the second display area based on the image data, where the one of the first display area and the second display area may be selected based on the usage information.

An exemplary embodiment of a display device and a driving method thereof may alternately select the display areas based on usage information (e.g., a total size or a degree of change of image data, whether or not image data is used in a previous partial display mode) of the display areas of the display panel upon entry into the partial display mode. Thus, a degree of degradation of the display panel is uniform as a whole and an image quality and a life-span of a display device may be improved.

However, the effect of the invention is not limited to the effects described above, but may be variously extended in a range that does not depart from the idea and scope of the invention.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 3 is a block diagram showing an exemplary embodiment of a display device according to the invention.

FIG. 7 is a drawing illustrating another operation of a calculator of FIG. 6A.

FIGS. 8A and 8B are drawings illustrating an operation of a determinator included in a selector of FIG. 5.

FIG. 9 is a block diagram showing another exemplary embodiment of a calculator included in a selector of FIG. 5.

DETAILED DESCRIPTION

Figure 1:
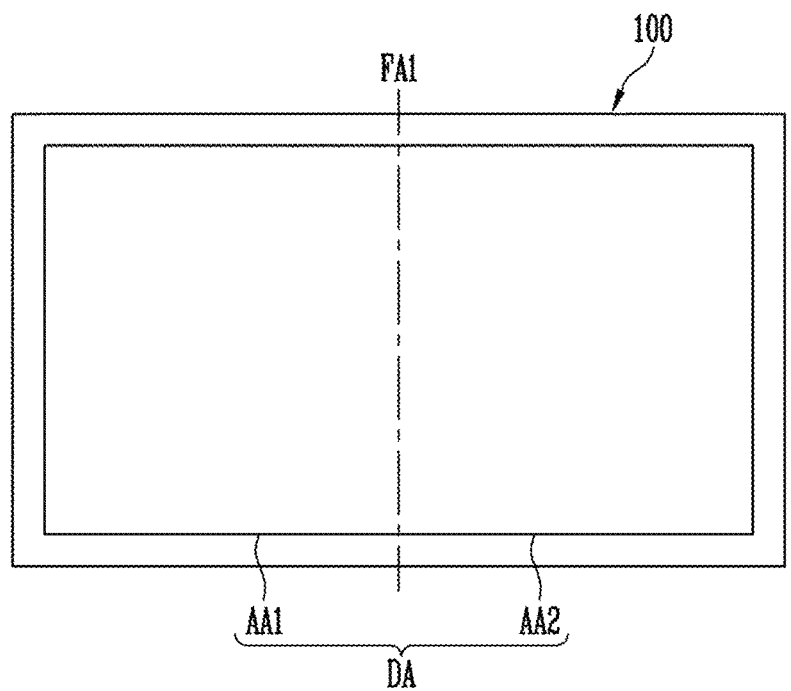
FIG. 1 is a drawing showing an exemplary embodiment of a display panel according to the invention.

Hereinafter, with reference to accompanying drawings, various exemplary embodiments of the invention will be described in detail so that those skilled in the art may easily carry out the invention. The invention may be embodied in many different forms and is not limited to the exemplary embodiments described herein.

In order to clearly illustrate the invention, parts that are not related to the description are omitted, and the same or similar constituent elements are given the same reference numerals throughout the specification. Therefore, the above-mentioned reference numerals can be used in other drawings.

In addition, since the size and thickness of each configuration shown in the drawing are arbitrarily shown for better understanding and ease of description, the invention is not necessarily limited to the illustrated one. In the drawings, the dimensions of layers and regions are exaggerated for clarity of illustration.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a drawing showing an exemplary embodiment of a display panel according to the invention.

Referring to FIG. 1, the display panel 100 may include a display area DA. A data signal corresponding to image data is provided to the display area DA, and an image corresponding to the data signal is displayed in the display area DA.

The display panel 100 may be a flexible display panel. In an exemplary embodiment, at least one area of the display panel 100 may be flexibly implemented to be capable of being bent, folded, and/or rolled, for example.

In an exemplary embodiment, the display panel 100 may be a flexible organic light emitting display panel including a flexible substrate, a plurality of pixels (e.g., a pixel including a light emitting element and a pixel driving circuit) provided on the flexible substrate, and a flexible thin film encapsulation sealing the pixels. However, a type and/or a form of the display panel 100 of the invention are not particularly limited thereto.

In an exemplary embodiment, the display panel 100 may display a valid image throughout the display area DA in the unstrained state, for example, in a flat unfolded state. In addition, the display panel 100 may display a valid image only in a portion of the display area DA, e.g., areas exposed to the user in a deformed state, e.g., bent, folded and/or rolled state.

In an exemplary embodiment, the display area DA may be divided into a first display area AA1 (or a first area) and a second display area AA2 (or a second area) with reference to a folding axis FA1 (or a folding line).

The first display area AA1 and the second display area AA2 are shown to be disposed continuously in FIG. 1, but are not limited thereto. In an exemplary embodiment, the first display area AA1 and the second display area AA2 may be spaced apart from each other with reference to the folding axis FA1, for example.

Figure 2A:
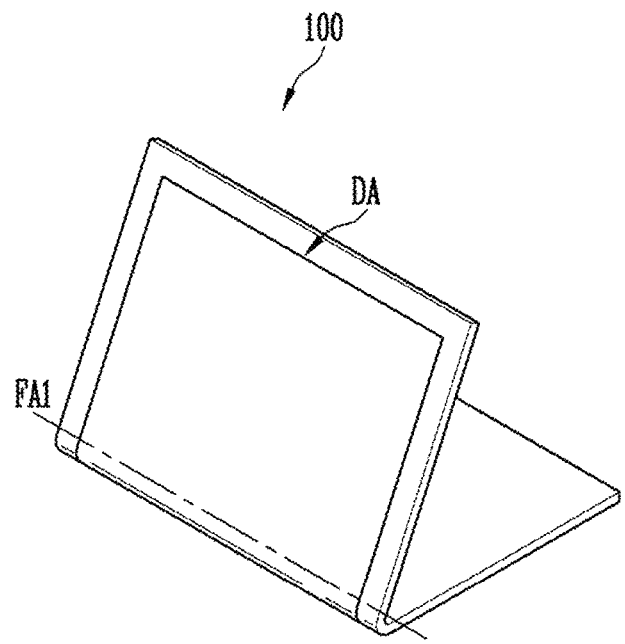
FIGS. 2A and 2B are drawings showing deformed states of the display panel of FIG. 1.
Figure 2B:

FIGS. 2A and 2B are drawings showing deformed states of the display panel of FIG. 1. FIG. 1 shows the display panel in an unfolded state, and FIGS. 2A and 2B show the display panel in a folded state.

The display panel 100 may be out-folded. In an exemplary embodiment, the display panel 100 may be out-folded with the display area DA facing outward with reference to the folding axis FA1 (or a folding line FA2 crossing the folding axis FA1), for example. That is, an image may be displayed through a front surface of the display panel 100, and the display panel 100 is folded so that a back surface of the display panel 100 may be relatively adjacent or abutted. However, this is an exemplary embodiment, and the display panel 100 may be implemented to enable both in-folding and out-folding. In this case, the folding axis for in-folding and the folding axis FA1 for out-folding may or may not coincide with each other.

FIG. 3 is a block diagram showing an exemplary embodiment of a display device according to the invention.

Referring to FIG. 3, a display device 1000 may include a display panel 100, a display driver 200, and a processor 300. In an exemplary embodiment, the display device 1000 may further include a sensor 400 for sensing a deformation of the display panel 100.

The display panel 100 may be a flexible display panel. That is, the display panel 100 may be bent, folded and/or rolled.

The display device 1000 including the display panel 100 may display a valid image in at least a portion of the entire display area DA according to a use environment, a condition and/or a state. In an exemplary embodiment, the display device 1000 may be driven in the full display mode (or a first mode, e.g., a first display mode) in an expanded state, and may display a valid image by the entire display area DA during a period in which the full display mode is performed, for example. In another exemplary embodiment, the display device 1000 is switched to a partial display mode (or a second mode, e.g., a second display mode or a third display mode) in an out-folded state (or a folded state), and may display a valid image by only a portion (e.g., a first display area AA1 or a second display area AA2) of the display area DA exposed to the user during a period in which the partial display mode is performed.

The display area DA is shown to have a long shape in the horizontal direction in FIG. 3, but the invention is not limited thereto. That is, the shape and disposition direction of the display area DA in the invention are not particularly limited. In an exemplary embodiment, the display area DA may have a long shape in a horizontal direction or a vertical direction according to a usage direction of the display device, and an image displayed in a display area DA may be rotated according to the usage direction.

In an exemplary embodiment, the display area DA may be divided into a plurality of display areas AA1 and AA2. In an exemplary embodiment, the display area DA may include a first display area AA1 and a second display area AA2 adjacent thereto, for example. This, however, is an exemplary embodiment and the number of areas (e.g., first and second display areas AA1 and AA2) constituting the display area DA is not limited thereto.

In an exemplary embodiment, at least one kind of lines of scan lines S and data lines D disposed in the first and second display areas AA1 and AA2 may be continuously disposed without interruption between the first and second display areas AA1 and AA2. In an exemplary embodiment, the scan line S may be continuously disposed between the first and second display areas AA1 and AA2, for example. That is, the scan line S may extend in a first direction across the first and second display areas AA1 and AA2.

In another exemplary embodiment, the data line D may be disposed continuously between first and second display areas AA1 and AA2. That is, the data line D may extend in a direction across the first and second display areas AA1 and AA2. The invention, however, is not limited thereto.

The first and second display areas AA1 and AA2 may include a plurality of pixels P1 or P2. In an exemplary embodiment, the first display area AA1 may include a scan line S, a data line D, and a first pixel P1 connected to the scan line S and the data line D, for example. Similarly, the second display area AA2 may include a scan line S, a data line D, and a second pixel P2 connected to the scan line S and the data line D.

The display driver 200 may include a selector 220 (or an area selector), a scan driver 240 (or a gate driver), a data driver 260, and a timing controller 280 (or an image converter). In an exemplary embodiment, the selector 220 may be configured inside the timing controller 280, but is not limited thereto.

In an exemplary embodiment, the scan driver 240, the data driver 260, and the timing controller 280 may be integrally integrated. In an exemplary embodiment, the display driver 200 may be implemented as a timing controller embedded driver integrated circuit ("TED D-IC") including the timing controller 280 therein, for example. The invention, however, is not limited thereto. In an exemplary embodiment, at least one of the scan driver 240, the data driver 260, and the timing controller 280 may be separated, for example.

The scan driver 240 receives a scan control signal SCS from the timing controller 280 and generates a scan signal SS in response to the scan control signal SCS. In an exemplary embodiment, the scan control signal SCS may include a gate start pulse and a gate shift clock. In an exemplary embodiment, the scan driver 240 may sequentially generate the scan signal SS by sequentially shifting the gate start pulse using the gate shift clock, and provide the scan signal SS to the scan line S.

The data driver 260 may receive the data control signal DCS and a second image data DATA2 (or compensated image data) from the timing controller 280. In an exemplary embodiment, the data control signal DCS may include a source start pulse, a source shift clock, and a source output enable signal. The data driver 260 may generate a data signal DS corresponding to the second image data DATA2 using the data control signal DCS and provide the data signal DS to the data line D.

When the display device 1000 is driven in the full display mode (hereinafter, referred to as a first display mode) displaying a valid image throughout the display area DA, the timing controller 280 may convert input image data (e.g., the first image data DATA1) provided from the processor 300, and provide converted image data DATA1' to the data driver 260. The first image data DATA1 may correspond to the first and second display areas AA1 and AA2.

When the display device 1000 is driven in the partial display mode displaying a valid image only in a portion of the display area DA, the timing controller 280 may convert input image data (e.g., a second image data DATA2) provided from the processor 300, and provide converted second image data DATA2' (or a second conversion data) to the data driver 260. The second image data DATA2 may correspond to one of the first display area AA1 and the second display area AA2. In an exemplary embodiment, the second image data DATA2 may correspond to the first display area AA1, for example.

In an exemplary embodiment, when the display device 1000 is driven in the partial display mode (hereinafter, referred to as a second display mode) displaying a valid image only in the first display area AA1, the timing controller 280 may convert (or arrange) the input image data (e.g., the second image data DATA2) provided from the processor 300 corresponding to the first display area AA1, and provide the converted second image data DATA2' to the data driver 260, for example. In this case, the data driver 260 may generate the data signal DS corresponding to the first display area AA1 based on the converted second image data DATA2', and the display panel 100 may display an image corresponding to the converted second image data DATA2' in the first display area AA1.

The data driver 260 may block an output corresponding to the second display area AA2. In an exemplary embodiment, an area selection signal SEL may be provided to the data driver 260 while being included in the data control signal DCS, so the data driver 260 may turn off an output buffer (or a source amplifier) connected to the data line D of the second display area AA2, for example.

In another exemplary embodiment, when the display device 1000 is driven in the partial display mode (hereinafter, referred to as a third display mode) displaying a valid image only in the second display area AA2, the timing controller 280 may convert (or arrange) the input image data (e.g., the second image data DATA2) provided from the processor 300 corresponding to the second display area AA2, and provide the converted second image data DATA2' to the data driver 260. In this case, the data driver 260 may generate the data signal DS corresponding to the second display area AA2 based on the converted second image data DATA2', and the display panel 100 may display an image corresponding to the converted second image data DATA2' in the second display area AA2. The data driver 260 may block an output corresponding to the first display area AA1.

In an exemplary embodiment, the timing controller 280 may convert the second image data DATA2 based on the area selection signal SEL (or area selection information)

provided from the selector 220. That is, one of the second display mode and the third display mode is selected or determined based on the area selection signal SEL, and the timing controller 280 may convert the second image data DATA2 based on selected one of the second display mode and the third display mode.

Here, the area selection signal SEL may include a first setting value (or first selection information) corresponding to the first display area AA1 or a second setting value (or second selection information) corresponding to the second display area AA2. In an exemplary embodiment, when the area selection signal SEL includes the first setting value, the timing controller 280 may operate in the second display mode, and generate the converted second image data DATA2' corresponding to the first display area AA1, for example. In another exemplary embodiment, when the area selection signal SEL includes the second setting value, the timing controller 280 may operate in the second display mode, and generate the converted second image data DATA2' corresponding to the second display area AA2.

The selector 220 may generate the area selection signal SEL based on usage information of the first display area AA1 and/or usage information of the second display area AA2. Here, the usage information may include a stress value (e.g., an accumulated grayscale value, a driving time, a degree of degradation, a life-span, or the like) occurring as corresponding area displays the image, or may include information on whether the corresponding area is used in the previous mode.

In an exemplary embodiment, the selector 220 may generate the area selection signal SEL based on the second image data DATA2 (or the first image data DATA1).

In an exemplary embodiment, the selector 220 may accumulate or sum the second image data DATA2 or values (e.g., grayscale values) included in the second image data DATA2, and may change one setting value of the area selection signal SEL to another setting value when the summed value exceeds a reference value while the display device 1000 is continuously driven in the second display mode or the third display mode, for example.

In another exemplary embodiment, the selector 220 may determine whether the image of the same pattern is continuously output based on the second image data DATA2, and may change one setting value of the area selection signal SEL to another setting value according to the determination result while the display device 1000 is continuously driven in the second display mode or in the third display mode.

That is, the selector 220 may obtain usage information for at least one of the first and second display areas AA1 and AA2 based on the second image data DATA2 (or the first image data DATA1), and select or change the area (i.e., the first display area AA1 or the second display area AA2) in which the image is to be displayed based on the usage information.

In an exemplary embodiment, the selector 220 may provide the area selection signal SEL to the timing controller 280 when entering the partial display mode (e.g., upon entry from the full display mode or a standby mode into the partial display mode). In this case, screen switching between the first display area AA1 and the second display area AA2 may be prevented while the display device 1000 is driven in the partial display mode.

A more specific configuration and operation of the selector 220 will be described later with reference to FIGS. 5 and 10.

The selector 220 is shown as being separate from the timing controller 280, the data driver 260, and the like in FIG. 3, but the invention is not limited thereto. In an exemplary embodiment, at least one portion of the selector 220 may be provided inside the timing controller 280 and/or the data driver 260, for example. In an alternative exemplary embodiment, the selector 220 may be provided inside the processor 300.

The processor 300 generates the control signal CS and the input image data DATA1 or DATA2 for driving the display driver 200 and/or the display panel 100. In an exemplary embodiment, the processor 300 may be an application processor of a mobile device. A type of the processor 300, however, is not limited thereto, and the processor 300 may be another type of processor that is compatible with the display device.

The processor 300 may select one of the full display mode (or the first display mode) and the partial display mode (or the second display mode or the third display mode), and control the display driver 200 and/or display panel 100 according to the selected mode. In an exemplary embodiment, the processor 300 may provide the first image data DATA1 corresponding to the entire display area DA and the control signal CS for controlling the display driver 200 to the display driver 200 corresponding to the full display mode, for example. In an alternative exemplary embodiment, the processor 300 may provide the second image data DATA2 corresponding to the first display area AA1 and the control signal CS to the display driver 200 corresponding to the partial display mode. For convenience, in describing the invention, the display mode is broadly divided into the full display mode (or the first display mode) and the partial display mode, and the partial display mode is divided into the second display mode and the third display mode, but the invention is not limited thereto. In an exemplary embodiment, the display mode may be subdivided into a plurality of partial display modes, each of which displays a valid image as a partial in an area of a different position and/or an area of a different range, for example. In this case, the display mode may be divided into at least four modes.

In an exemplary embodiment, a sensing signal SES may include information on the deformation, a degree of the deformation, and/or a deformation area of the display panel 100. In this case, the processor 300 may select one of the modes and/or valid display areas in response to the sensing signal SES and operate in response to the selected mode. In an exemplary embodiment, the processor 300 may generate a selection signal corresponding to the selected mode and generate the second image data DATA2 by matching a predetermined image to be displayed with the selected valid display area, for example.

In an exemplary embodiment, the selection signal may be included in the control signal CS and provided to the display driver 200. Then, the display driver 200 may operate in the full display mode or partial display mode corresponding to the selection signal. In this case, the selector 220 may respond to a selection signal corresponding to the partial display mode to provide the area selection signal SEL to the timing controller 280. Accordingly, the display driver 200 may operate in the second display mode or the third display mode.

When the selector 220 is provided inside the processor 300, the selection signal may include an area selection signal SEL, and the display driver 200 may operate as one of the first to third display modes corresponding to the selection signal.

The sensor 400 may include a sensing element for sensing a use environment and/or state of the display device 1000. In an exemplary embodiment, the sensor 400 may include the sensing element that is provided inside or around the display panel 100 to sense the deformation of the display panel 100 and output a sensing signal SES corresponding thereto, for example. In an exemplary embodiment of the invention, a type of the sensor 400 is not particularly limited. That is, the sensor 400 may be implemented with various types of sensing elements now known, such as a bending sensor, a folding sensor, an acceleration sensor, and the like.

In an exemplary embodiment, the display device 1000 may further include an indicator 500.

The indicator 500 may be provided inside or around the display panel 100 to provide information for the display area driven through the display panel 100 to the user. In an exemplary embodiment, the indicator 500 may be implemented as lamps disposed adjacent to each of the first and second display areas AA1 and AA2 and the lamp adjacent to the valid display area may periodically emit light based on the area selection signal SEL provided from the selector 220, for example. In this case, the user may recognize the valid display area based on whether the lamp emits light.

As described above, the display device 1000 in exemplary embodiments of the invention may alternately select the first display area AA1 and the second display area AA2 as a valid display area for displaying an image in the partial display mode based on usage information (e.g., a total size of the image data, a degree of change of the image data, whether or not the image data is used in the previous partial display mode) of the first and second display areas AA1 and AA2 of the display panel 100. Thus, the degree of degradation of the display panel 100 is uniform as a whole and an image quality and a life-span of a display device may be improved.

Figure 4A:
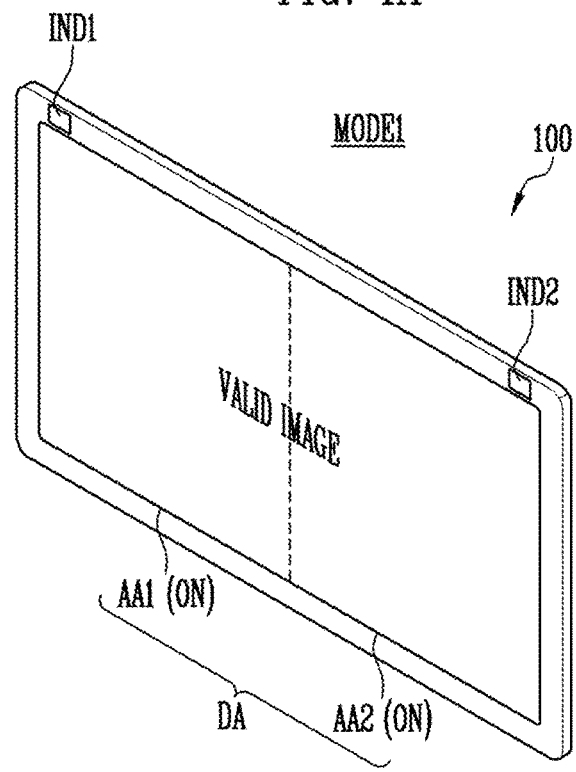
FIGS. 4A to 4C are drawings showing an operation of a display panel according to a mode of a display device of FIG. 3.
Figure 4B:
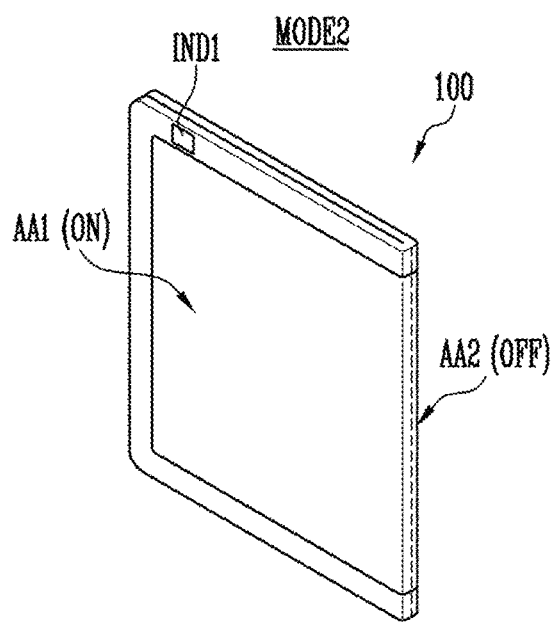
Figure 4C:
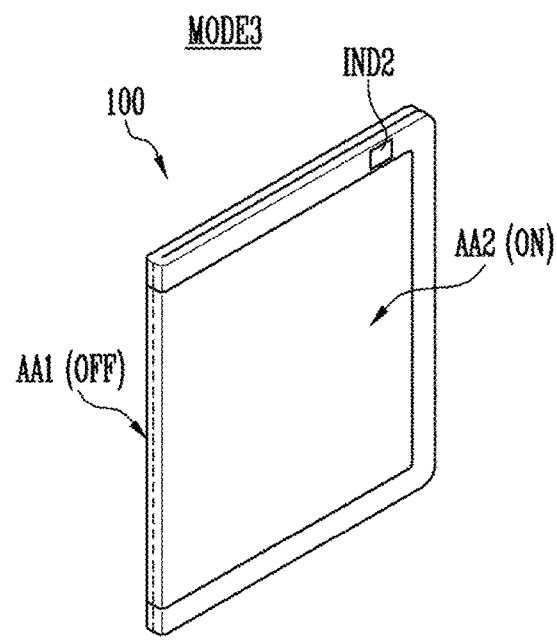

FIGS. 4A to 4C are drawings showing an operation of a display panel according to a mode of a display device of FIG. 3.

Referring to FIGS. 3 to 4C, the display device 1000 may be driven in one of the first display mode MODE1, the second display mode MODE2, and the third display mode MODE3 according to a predetermined usage environment, a state and/or condition, or the like.

In an exemplary embodiment, the display device 1000 may be driven in the first display mode MODE1 with the display panel 100 or the display area DA fully expanded. In an exemplary embodiment, when the sensor 400 cannot sense a deformation (e.g., bending or folding) of the display panel 100, the display device may be driven in the first display mode MODE1, for example.

The processor 300 may set the entire display area DA including the first and second display areas AA1 and AA2 to the valid display area in response to the first display mode MODE1 and generate the first image data DATA1 corresponding to the entire display area.

The display driver 200 may generate a first data signal corresponding to the first image data DATA1 and provide the first data signal to the first and second pixels P1 and P2 through the data line D. Accordingly, as shown in FIG. 4A, a valid image VALID IMAGE corresponding to the first image data DATA1 may be displayed throughout the display area DA.

A first indicator IND1 may be provided adjacent to the first display area AA1 of the display panel 100, and a second indicator IND2 may be provided adjacent to the second display area AA2 of the display panel 100. The first indicator IND1 and the second indicator IND2 may be included in the indicator 500 described with reference to FIG. 3. Each of the first indicator IND1 and the second indicator IND2 may be implemented as a lamp, but is not limited thereto.

When the display device 1000 operates in the first display mode MODE1, both the first indicator IND1 and the second indicator IND2 may be activated (e.g., periodically emitting light) or deactivated (e.g., not emitting light). The invention, however, is not limited thereto. In an exemplary embodiment, when being switched to the partial display mode at predetermined time, only one indicator (e.g., the second indicator IND2) corresponding to an area (e.g., the second display area AA2) to be selected may be activated and another indicator may be deactivated, for example.

In an exemplary embodiment, the display device may be driven in the partial display mode (i.e., the second display mode MODE2 or the third display mode MODE3) in a state in which the display panel 100 or the display area DA is deformed. In an exemplary embodiment, when the sensor 400 senses the deformation (bending or folding) of the display panel 100, the display device may be driven in the second display mode MODE2 or the third display mode MODE3, for example. Specifically, the sensor 400 may output the sensing signal SES when the display panel 100 is out-folded beyond a predetermined rotation angle.

The processor 300 may generate second image data DATA2 corresponding to a portion (e.g., the first display area AA1) of the display area in response to the partial display mode.

In an exemplary embodiment, the selector 220 may set the first display area AA1 or the second display area AA2 to the valid display area based on input image data DATA1 or DATA2 (or the second image data DATA2), and may provide an area selection signal SEL for the valid display area to the timing controller 280 in response to the sensing signal SES.

In an exemplary embodiment, as shown in FIG. 4B, when the first display area AA1 is set to the valid display area, the timing controller 280 may suitably convert the second image data DATA2 to the first display area AA1 (or an array of the first pixels P1 in the first display area AA1), and the data driver 260 may generate a second data signal corresponding to the converted second image data DATA2' and provide it to the first pixel P1 through the data line D, for example. Accordingly, a valid image VALID IMAGE corresponding to the second image data DATA2 in the first display area AA1 may be displayed.

When the first display area AA1 is set to the valid display area, the first indicator IND1 may be activated and the second indicator IND2 may be deactivated.

In another exemplary embodiment, as shown in FIG. 4C, when the second display area AA2 is set to the valid display area, the timing controller 280 may shift the second image data DATA2 in response to the second display area AA2 and convert the shifted second image data DATA2 to the second display area AA2 (or an array of the second pixels P2 in the second display area AA2), and the data driver 260 may generate a second data signal corresponding to the converted second image data DATA2' and provide it to the second pixels P2 through the data line D. Accordingly, a valid image VALID IMAGE corresponding to the second image data DATA2 in the second display area AA2 may be displayed.

When the second display area AA2 is set to the valid display area, the second indicator IND2 may be activated and the first indicator IND1 may be deactivated.

Figure 5:
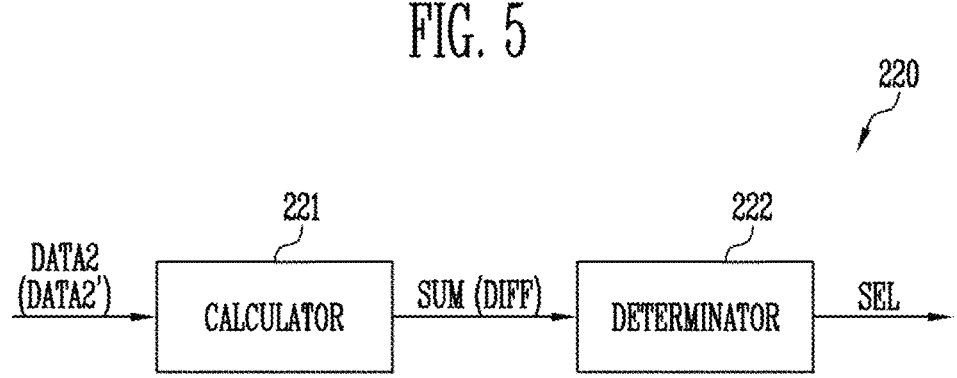
FIG. 5 is a block diagram showing an exemplary embodiment of a selector included in a display device of FIG. 3.

FIG. 5 is a block diagram showing an exemplary embodiment of a selector included in a display device of FIG. 3.

Referring to FIGS. 3 and 5, the selector 220 may generate and update the area selection signal SEL based on the second image data DATA2 (or the converted second image data DATA2').

The selector 220 may include a calculator 221 (or a calculating circuit) and a determinator 222 (or a determining circuit).

The calculator 221 may calculate the second image data DATA2 (or frame data) provided sequentially over time.

In an exemplary embodiment, the calculator 221 may sum or accumulate at least some of grayscale values included in the second image data DATA2, for example. In this case, the calculator 221 may output the sum SUM (or accumulated data, accumulated value of the grayscale values, and an average of the accumulated values) of the second image data DATA2.

In another exemplary embodiment, the calculator 221 may subtract the frame data included in the second image data DATA2. In this case, the calculator 221 may output a change value DIFF (or a difference value, and difference value between the image data) of the second image data DATA2. Here, the change value DIFF of the second image data DATA2 indicates a degree of change of the second image data DATA2. In an exemplary embodiment, a size of the change value DIFF of the second image data DATA2 in the case of a still image may be smaller and the size of the change value DIFF of the second image data DATA2 in the case of a motion image may be greater, for example.

A more specific operation of the calculator 221 will be described later with reference to FIGS. 6A, 6B and 9.

The determinator 222 may compare the output of the calculator 221 with a reference value and generate or change the area selection signal SEL (or the setting value of the area selection signal SEL) based on the comparison result. In an exemplary embodiment, when the sum SUM of the second image data DATA2 output from the calculator 221 exceeds a first reference value, the determinator 222 may change the setting value of the area selection signal SEL to another setting value, for example. In another exemplary embodiment, when the change value DIFF of the second image data DATA2 output from the calculator 221 exceeds a second reference value, the determinator 222 may change the setting value of the area selection signal SEL to another setting value. Here, each of the first reference value and the second reference value may be predetermined or variable to have a fixed value.

Figure 6A:
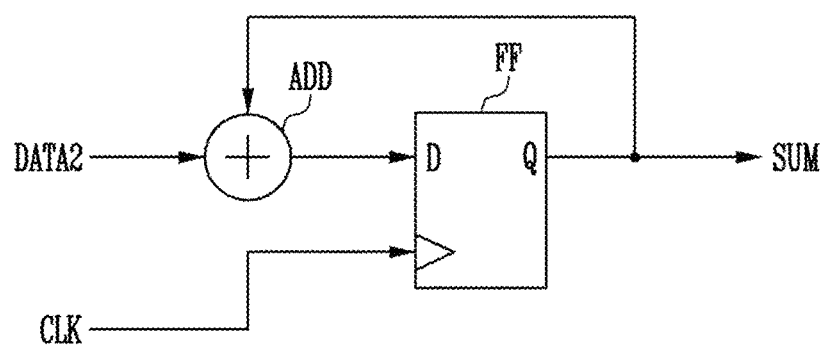
FIG. 6A is a block diagram showing an exemplary embodiment of a calculator included in a selector of FIG. 5.

FIG. 6A is a block diagram showing an exemplary embodiment of a calculator included in a selector of FIG. 5. FIG. 6B is a drawing illustrating an operation of a calculator of FIG. 6A.

Figure 6B:
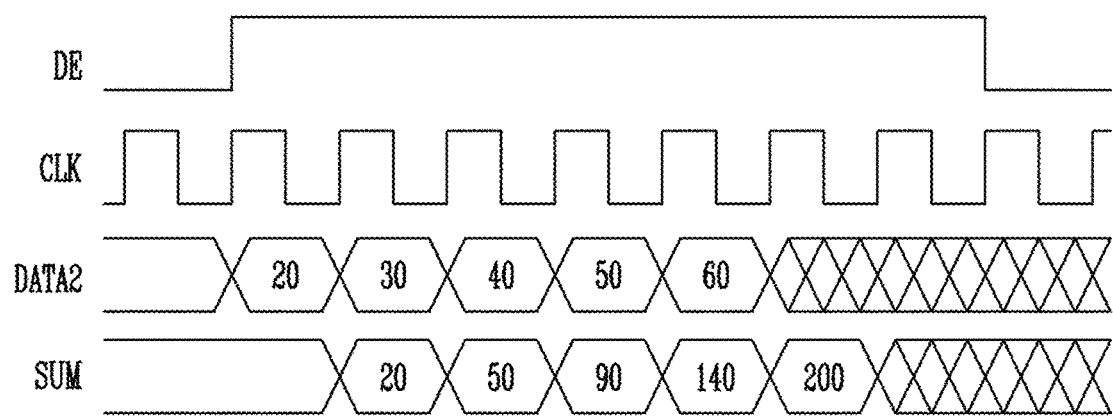
FIG. 6B is a drawing illustrating an operation of a calculator of FIG. 6A.

Referring to FIGS. 5 to 6B, the calculator 221 may include an adder ADD and a storage unit FF (or a counter).

The adder ADD may add the grayscale values included in the second image data DATA2 to the stored sum SUM (i.e. the sum of the second image data DATA2).

The storage unit FF may store the output, that is, a newly calculated sum SUM of the adder ADD in response to a clock signal CLK and output the stored sum SUM at the same time. Here, the clock signal CLK may be synchronized with a transmission speed of the second image data DATA2.

As shown in FIG. 6B, when a source enable signal included in the data control signal DCS (refer to FIG. 3) has a logic high level, the grayscale values 20, 30, 40, 50, and 60 of the second data signal DATA2 may be provided to the adder ADD sequentially. In addition, the storage unit FF may provide the sum SUM to the adder ADD sequentially in response to the clock signal CLK. According to an operation of the adder ADD and the storage unit FF, the sum SUM may be updated to 20, 30, 90, 140, 200, or the like.

FIG. 7 is a drawing illustrating another operation of a calculator of FIG. 6A.

Referring to FIGS. 5, 6A and 7, at a first time T1, the display device 1000 (refer to FIG. 3) may enter or operate in the partial display mode, that is, the second display mode MODE2 or the third display mode MODE3. In an exemplary embodiment, the display device 1000 may change a mode from the first display mode MODE1 or the standby mode STANDBY MODE to the second display mode MODE2, for example. Here, an image may not be displayed on the display panel 100 in the standby mode STANDBY MODE.

At a second time T2, the second display mode MODE2 or the third display mode MODE3 may end. In an exemplary embodiment, the display device 1000 may change the mode from the second display mode MODE2 to the first display mode MODE1 or the standby mode STANDBY MODE, for example.

In an exemplary embodiment, the calculator 221 may calculate the sum SUM of the second image data DATA2 while the display device 1000 is operating in the second display mode MODE2 or the third display mode MODE3, i.e., in a first interval between the first time T1 and the second time T2.

In an exemplary embodiment, the calculator 221 may sum a first to k-th frame data FRAME1 to FRAMEk (here, k is an integer of 2 or more) included in the second image data DATA2, for example.

In an exemplary embodiment, when the display device 1000 enters the partial display mode (i.e., the second display mode MODE2 or the third display mode MODE3) or exits the partial display mode (i.e., when switched to the first display mode MODE1 or the standby mode STANDBY MODE), the sum SUM may be initialized. In this case, a capacity of the storage unit FF for storing the sum SUM may be reduced. The invention, however, is not limited thereto. In an exemplary embodiment, the sum SUM calculated from the partial display mode (i.e., the second display mode MODE2 or the third display mode MODE3) may be stored and updated for each of the first and second display areas AA1 and AA2 in a separate memory device, for example.

In an exemplary embodiment, the calculator 221 may calculate the sum SUM by summing a portion of the second image data DATA2. In an exemplary embodiment, the calculator 221 may calculate the sum SUM by summing or accumulating the grayscale values corresponding to a portion of the display panel (refer to FIG. 3) of the grayscale values included in the second image data DATA2, for example.

In an exemplary embodiment, when the display panel 100 has a resolution of FHD (i.e., 1920*1080), the first to k-th frame data FRAME1 to FRAMEk may include 1920*1080 grayscale values, for example. In addition, partial data SP1 to SPk of the first to k-th frame data FRAME1 to FRAMEk may include 192*108 grayscale values, for example. The calculator 221 may reduce a load on the calculator 221 by summing the grayscale values of the partial data SP1 to SPk.

Each of the partial data SP1 to SPk may be line data including grayscale values corresponding to a specific row or column.

Figure 8A:
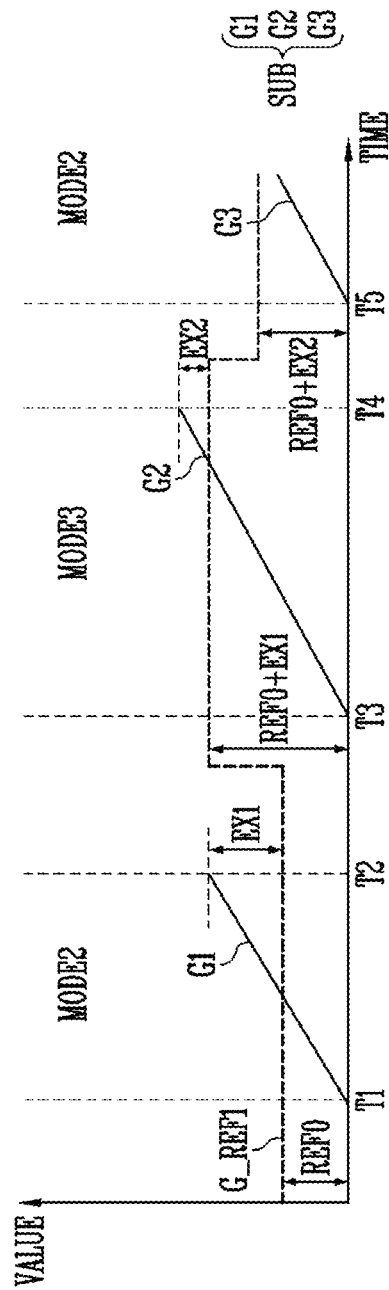

FIGS. 8A and 8B are drawings illustrating an operation of a determinator included in a selector of FIG. 5. FIGS. 8A and 8B shows a change in the sum (SUB) (i.e., the sum of the second image data DATA2 described with reference to FIG. 5) over time and a change of a mode according thereto. In FIGS. 8A and 8B, a first graph G1, a second graph G2 and a third graph G3 may represent the sum SUB, and a first reference graph G_REF1 may represent a first reference value. For understanding and ease of description, the first graph G1, the second graph G2 and the third graph G3 are shown to change linearly.

First, referring to FIGS. 5 and 8A, the display device 1000 may enter the second display mode MODE2 at the first time T1, and may exit the second display mode MODE2 at the second time T2.

In the first interval between the first time T1 and the second time T2, the first reference value may be the same as the predetermined initial reference value REF0.

Along the first graph G1, the sum SUB may increase.

The determinator 222 may periodically compare the SUB and the first reference value and may change the area selection signal SEL (or a setting value of the area selection signal SEL) when the sum SUB exceeds the first reference value.

At an intersection of the first graph G1 and the first reference graph G_REF1, the determinator 222 may change the area selection signal SEL. In an exemplary embodiment, the determinator 222 may change the setting value of the area selection signal SEL from a first setting value (i.e., the first setting value corresponding to the second display mode MODE2 or the first display area AA1) to a second setting value (i.e., the second setting value corresponding to the third display mode MODE3 or the second display area AA2), for example.

When the area selection signal SEL is provided to the timing controller 280 only at the time of entering the partial display mode (i.e., the second display mode MODE2 or the third display mode MODE3), the display device 1000 may operate in the second display mode MODE2 to the second time T2. Similarly, even when the area selection signal SEL is provided to the timing controller 280 at the time of when the area selection signal SEL is changed, the timing controller 280 may hold the area selection signal SEL until the end of the second display mode MODE2 so that the display device 1000 operates in the second display mode MODE2 until the second time T2.

The invention, however, is not limited to thereto, and the display device 1000 may change the mode to another mode (e.g., the third display mode MODE3) at the time when the area selection signal SEL is changed.

Then, the display device 1000 may enter the third display mode MODE3 based on the area selection signal SEL (e.g., the area selection signal SEL updated before the third time T3) at the third time T3 and exit the third display mode MODE3 at the fourth time T4.

In an exemplary embodiment, the determinator 222 (or the selector 220) may update the first reference value based on the sum SUM when entering the partial display mode (i.e., the second display mode MODE2 or the third display mode MODE3) or exiting the partial display mode. In an exemplary embodiment, the greater the sum SUM, the greater the first reference value, for example.

In an exemplary embodiment, the determinator 222 may adjust the first reference value in the current mode based on the difference between the sum SUM and the first reference value in the previous mode.

In an exemplary embodiment, at the second time T2, the sum SUM may be greater than the first reference value, and the difference between the sum SUM and the first reference value may be the same as a first excess value EX1, for example. In this case, at the third time T3, the determinator 222 may adjust the first reference value to be equal to the sum (i.e., REF0+EX1) of the initial reference value REF0 and the first excess value EX1. That is, since the first display area AA1 exceeds the first reference value to be relatively more degraded in the first interval between the first time T1 and the second time T2, the first reference value in the second interval between the third time T3 and the fourth time T4 may become greater so as to match the degree of degradation of the second display area AA2 with the degree of degradation of the first display area AA1. That is, the entire first and second display areas AA1 and AA2, i.e., the display area DA (refer to FIG. 1), may be uniformly degraded by adjusting the first reference value.

The sum SUB may increase along the second graph G2 in the second interval between the third time T3 and the fourth time T4.

At an intersection of the second graph G2 and the first reference graph G_REF1, the determinator 222 may change the area selection signal SEL. In an exemplary embodiment, the determinator 222 may change the setting value of the area selection signal SEL from the second setting value to the first setting value, for example.

Accordingly, the display device 1000 may operate in the second display mode MODE2 at the fifth time T5.

At the fourth time T4, the sum SUM may be greater than the first reference value, and the difference between the sum SUM and the first reference value may be the same as a second excess value EX2. In this case, at the fifth time T5, the determinator 222 may adjust the first reference value to be equal to the sum (i.e., REF0+EX2) of the initial reference value REF0 and the second excess value EX2.

The first reference value is shown to increase only in FIG. 8A, but is not limited thereto. In an exemplary embodiment, according to the third graph G3, the second display mode MODE2 may end in a state where the sum SUM does not reach the first reference value, for example. In this case, based on the difference between the sum SUM and the first reference value, the first reference value of a later mode thereof may be set smaller than the initial reference value REF0.

In addition, when the area selection signal SEL is not changed in the previous mode thereof, the first reference value of the later mode thereof may be set to the difference between the first reference value of the previous mode and the sum SUM.

Referring to FIGS. 5, 8A and 8B, the graphs G1, G2, G3, and C_REF1 shown in FIG. 8B are substantially the same as or similar to the graphs G1, G2, G3, and C_REF1 shown in FIG. 8A except for an interval between the sixth time T6 and the seventh time T7. Therefore, redundant descriptions will be omitted.

At the sixth time T6, the display device 1000 may exit the third display mode MODE3.

According to the second graph G2, the sum SUM at the sixth time T6 may be smaller than the first reference value. In this case, the area selection signal SEL is unchanged, so that the sum SUM may not be initialized and the first reference value may not be adjusted.

At seventh time T7, the display device 1000 may re-enter the third display mode MODE3 according to the area selection signal SEL (i.e., unchanged area selection signal SEL) of the previous mode. In this case, the sum SUM at the sixth time T6 and the first reference value may be applied as it is.

As described with reference to FIGS. 8A and 8B, the determinator 222 may change or update the area selection signal SEL by comparing the sum SUB of the second image data DATA2 with the first reference value. In addition, the determinator 222 may adjust the first reference value in the later mode (or the partial display mode at a later time) based on the difference between the sum SUB in the previous mode (or the previous partial display mode) and the first reference value. Thus, the degradation of the display panel 100 may be uniform throughout the first and second display areas AA1 and AA2.

FIG. 9 is a block diagram showing another exemplary embodiment of a calculator included in a selector of FIG. 5.

Referring to FIGS. 5 and 9, the calculator 221 may include a buffer BUFFER (or a storage unit) and a subtractor SUBSTR.

The buffer BUFFER may store the grayscale values included in the second image data DATA2.

The subtractor SUBSTR may calculate the change value DIFF by subtracting the buffer output BUFF (e.g., buffered/stored second image data DATA2) from the second image data DATA2 provided at the current time. Here, the change value DIFF of the second image data DATA2 indicates a degree of change of the second image data DATA2. In an exemplary embodiment, a size of the change value DIFF of the second image data DATA2 in the case of a still image may be smaller and the size of the change value DIFF of the second image data DATA2 in the case of a motion image may be greater, for example.

In this case, the determinator 222 may determine whether the change value DIFF exceeds the second reference value, and change the area selection signal SEL based on the determination result. In an exemplary embodiment, when the change value DIFF does not exceed the second reference value for a predetermined time or more, the determinator 222 may change the setting value of the area selection signal SEL to another setting value, for example.

Figure 10:
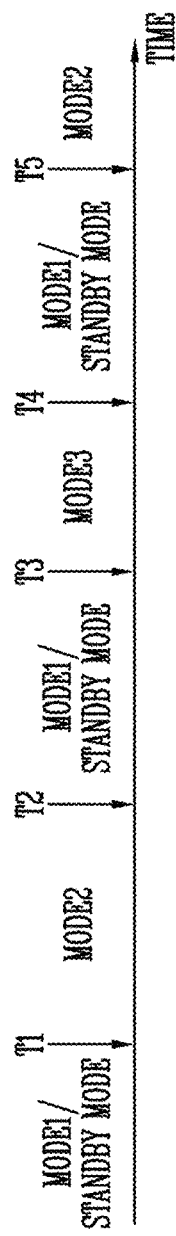
FIG. 10 is a drawing illustrating an operation of a selector of FIG. 5.

FIG. 10 is a drawing illustrating an operation of a selector of FIG. 5. FIG. 10 shows a change of a mode of the display device 1000 over time.

Referring to FIGS. 3, 5 and 10, the selector 220 may change the area selection signal SEL whenever the display device 1000 enters the partial display mode. In an exemplary embodiment, the selector 220 may alternately select the first setting value and the second setting value, for example.

As shown in FIG. 10, at the first time T1, the display device 1000 may enter the second display mode MODE2 from the first display mode MODE1 or the standby mode STANDBY MODE according to the predetermined area selection signal SEL. In an exemplary embodiment, according to a deformation of the display device 1000, the display device 1000 may perform a mode change from the first display mode MODE1 to the second display mode MODE2, or enter from the standby mode STANDBY MODE to the second display mode MODE2, for example.

The selector 220 may change the area selection signal SEL based on mode change to the second display mode MODE2 (or the partial display mode). In an exemplary embodiment, the selector 220 may change the first setting value of the area selection signal SEL to the second setting value, for example. The selector 220 may change the area selection signal SEL at the first time T1, immediately after the first time T1, or between the first time T1 and the second time T2.

At the second time T2, the display device 1000 may exit the second display mode MODE2 and may enter, for example, the first display mode MODE1 or the standby mode STANDBY MODE.

At the third time T3, the display device 1000 may enter the third display mode MODE3 according to the changed area selection signal SEL. In addition, the selector 220 may change the area selection signal SEL again based on the mode change to the third display mode MODE3 (or the partial display mode). In an exemplary embodiment, the selector 220 may change the second setting value of the area selection signal SEL to the first setting value again, for example.

At the fourth time T4, the display device 1000 may exit the third display mode MODE3 and may enter, for example, the first display mode MODE1 or the standby mode STANDBY MODE.

At the fifth time T5, the display device 1000 may enter the second display mode MODE2 according to the re-changed area selection signal SEL. An operation of the selector 220 after the fifth time T5 may be substantially the same as or similar to the operation of the selector 220 after the first time T1.

Figure 11:
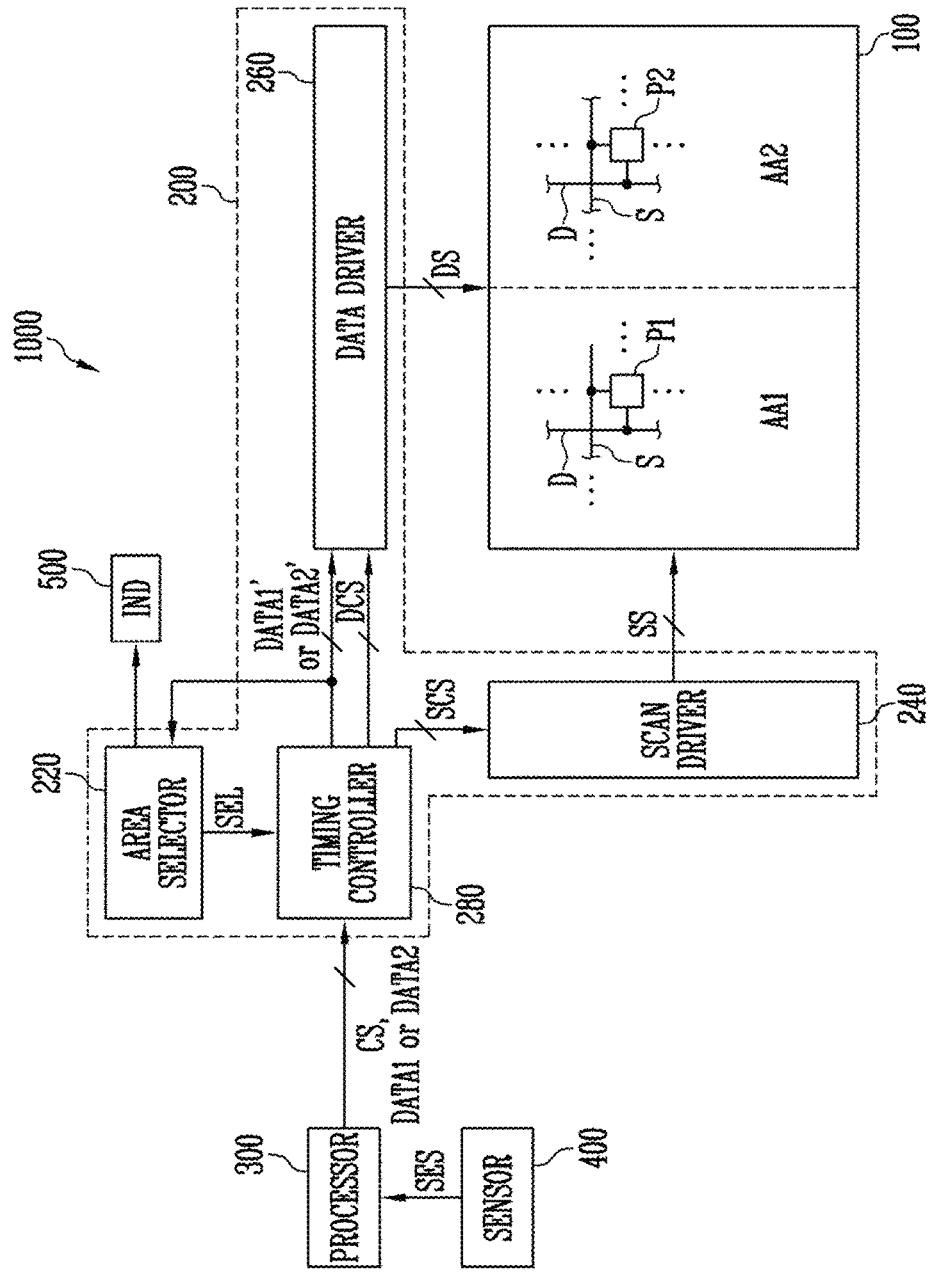
FIG. 11 is a block diagram showing another exemplary embodiment of a display device according to the invention.

FIG. 11 is a block diagram showing another exemplary embodiment of a display device according to the invention.

Referring to FIGS. 3 and 11, the display device 1000 of FIG. 11 is different from the display device 1000 of FIG. 3 in that the selector 220 of the display device 1000 of FIG. 11 receives the converted second image data DATA2 (and/or the converted first image data DATA1') instead of the second image data DATA2.

The selector 220 may generate the area selection signal SEL based on usage information of the first display area AA1 and/or usage information of second display area AA2. Here, the usage information may include a stress value (e.g., an accumulated grayscale value, a driving time, a degree of degradation, a life-span, or the like) occurring as corresponding area displays the image, or may include information on whether the corresponding area is used in the previous mode.

In an exemplary embodiment, the selector 220 may generate and update the area selection signal SEL based on the converted second image data DATA2'.

In an exemplary embodiment, as described with reference to FIGS. 5 to 8B, the selector 220 may accumulate or sum the converted second image data DATA2' or values (e.g., grayscale values) included in the converted second image data DATA2', and may change one setting value of the area selection signal SEL to another setting value when the summed value exceeds a reference value while the display device 1000 is continuously driven in the second display mode or the third display mode, for example.

In another exemplary embodiment, as described with reference to FIG. 9, the selector 220 may determine whether the image of the same pattern is continuously output based on the second image data DATA2, and may change one setting value of the area selection signal SEL to another setting value according to the determination result while the display device 1000 is continuously driven in the second display mode or the third display mode.

That is, the selector 220 may calculate the sum SUM or the change value DIFF of the converted second image data DATA2', and change the setting value of the area selection signal SEL based on the sum SUM or the change value DIFF.

In an exemplary embodiment, the selector 220 may accumulate the first image data DATA1 and the converted second image data DATA2' to generate a first sub-accumulated data corresponding to the first display area AA1 and a second sub-accumulated data corresponding to the second display area AA2, and update the area selection signal SEL or change the setting value of the area selection signal SEL based on the difference between the first sub-accumulated data and the second sub-accumulated data.

In an exemplary embodiment, the selector 220 may derive a first usage information such as a stress, a degree of degradation, and a life-span for the first display area AA1 through a calculation such as a sum, an average, and the like for the first sub-accumulated data, and similarly derive a second usage information for the second display area AA2 based on the second sub-accumulated data, for example. The selector 220 may change the area selection signal SEL based on the first usage information of the first display area AA1 and the second usage information of the second display area AA2. In an exemplary embodiment, the selector 220 may compare the degree of degradation of the first usage information with the degree of degradation of the second usage information when entering the partial display mode, and may update the area selection signal SEL to select a relatively non-degraded area, for example.

That is, the selector 220 may select an area for displaying an image in the partial display mode in consideration of the degree of use (e.g., the degree of degradation) of the first and second display areas AA1 and AA2 in the full display mode (or the first display mode MODE1) as well as the partial display mode (i.e., the second and third display modes MODE2 and MODE3). Thus, the degree of degradation of the display panel 100 may be more uniform as a whole, and the image quality and the life-span of the display device may be improved.

Figure 12:
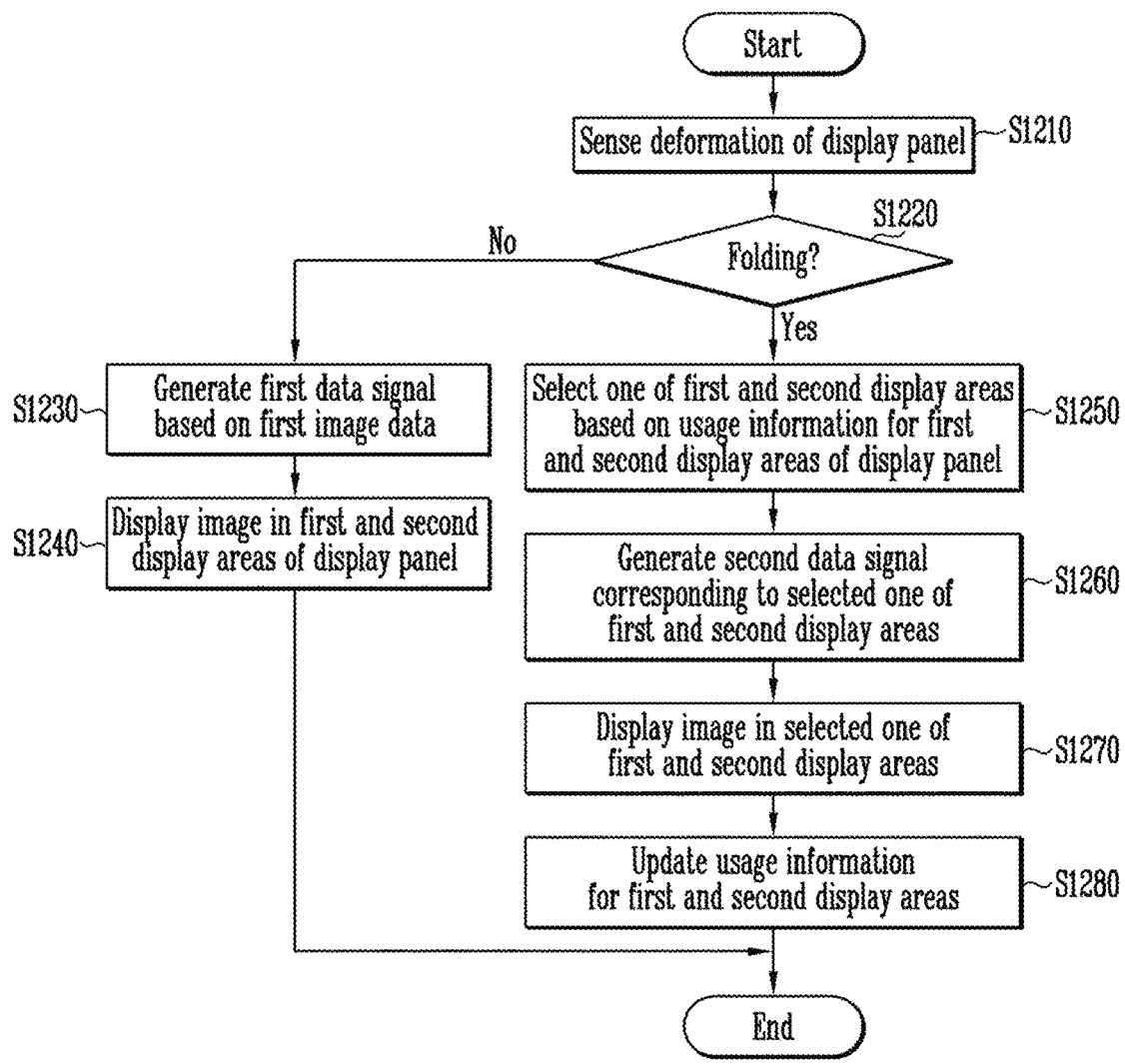
FIG. 12 is a flowchart showing an exemplary embodiment of a driving method of a display device according to the invention.

FIG. 12 is a flowchart showing an exemplary embodiment of a driving method of a display device according to the invention.

Referring to FIGS. 3, 11 and 12, the method of FIG. 12 may be performed in the display device 1000 of FIG. 3 or the display device 1000 of FIG. 11.

The method of FIG. 12 may sense the deformation of the display panel 100 (S1210).

In an exemplary embodiment, the method of FIG. 12 may sense the deformation (e.g., bending) of the display panel 100 using the sensor 400 and generate a sensing signal SES corresponding to the deformation, for example.

The method of FIG. 12 may determine whether the display panel 100 is in a folded state based on the sensing signal SES, and may determine a mode (e.g., the display mode) of the display device 1000 based on the determination result (S1220).

In an exemplary embodiment, in the method of FIG. 12, when the display panel 100 is in an unfolded state, the display device 1000 may be driven in the full display mode (i.e., the first display mode) and generate the first image data DATA1 (i.e., an input image data corresponding to the first and second display areas AA1 and AA2 of the display panel 100) through the processor 300, for example. In another exemplary embodiment, in the method of FIG. 12, when the display panel 100 is in a folded state, the display device 1000 may be driven in the partial display mode (i.e., the second display mode or the third display mode) and generate the second image data DATA2 (i.e., an input image data corresponding to the first and second display areas AA1 and AA2 of the display panel 100) through the processor 300.

When the display panel 100 is in the unfolded state, the method of FIG. 12 may generate a first data signal based on the first image data DATA1 (S1230), and may display an image on the first and second display areas AA1 and AA2 of the display panel 100 based on the first data signal (S1240).

When the display panel 100 is in a folded state, the method of FIG. 12 may select one of the first and second display areas AA1 and AA2 based on a usage information for the first and second display areas AA1 and AA2 of the display panel 100 (S1250). Here, the usage information may indicate a total size of the image data, a degree of change of the image data, whether or not the image data is used in the previous partial display mode, and the usage information may be calculated in the selector 220 based on at least one of the second image data DATA2, the converted second image data DATA2', and the converted first image data DATA1' (or the first image data) as described with reference to FIGS. 5 to 11.

In an exemplary embodiment, the method of FIG. 12 may calculate the sum SUM of the second image data DATA2 during the partial display mode, and change a setting value of the area selection signal SEL to another setting value when the sum SUM exceeds the first reference value, for example. In another exemplary embodiment, the method of FIG. 12 may calculate the change value DIFF of the second image data DATA2 during the partial display mode, and the determinator 222 may change a setting value of the area selection signal SEL to another setting value when the change value DIFF exceeds the second reference value (e.g., determine whether the second image data DATA2 having the same pattern continues for a predetermined time or longer). As described above, each of the first reference value and the second reference value may be predetermined to have a fixed value, or as described with reference to FIG. 8A, the first reference value may be variable.

Thereafter, the method of FIG. 12 may generate a second data signal corresponding to a selected one of the first and second display areas AA1 and AA2 based on the second image data DATA2 (S1260). In an exemplary embodiment, as described with reference to FIG. 3, in the second display area AA2 (or when the third display mode is selected), the timing controller 280 may shift and/or arrange the second image data DATA2 corresponding to the second display area AA2 to generate the converted second image data DATA2', and the data driver 260 may generate the second image data DATA2' to a second data signal of an analogue form, for example.

The method of FIG. 12 may provide the second data signal to a selected one of the first and second display areas AA1 and AA2. In an exemplary embodiment, in the second display area AA2 (or when the third display mode is selected), the data driver 260 may provide the second data signal to the second display area AA2 (i.e., the selected one of the first and second display areas AA1 and AA2), for example. The data driver 260 may block an output for the first display area AA1 (i.e., the other not selected of the first and second display areas AA1 and AA2), and for example, may turn off an output buffer connected to the data line D of the first display area AA1. Accordingly, an image may be displayed in the selected one of the first and second display areas (S1270).

The method of FIG. 12 may update usage information for the first and second display areas AA1 and AA2 (S1280). As described above, while the display device 1000 is driven in the partial display mode (and the full display mode), the method of 12 may update the usage information (e.g., the sum SUM, the change value DIFF, the degree of degradation, and the like) and the area selection signal SEL based on at least one of the second image data DATA2, the converted second image data DATA2', and the converted first image data DATA1' (or the first image data).

As described above, a driving method of the display device in exemplary embodiments of the invention may alternately select the first display area AA1 and the second display area AA2 as a valid display area for displaying an image in the partial display mode based on usage information (e.g., a total size of the image data, a degree of change of the image data, whether or not the image data is used in the previous partial display mode) of the first and second display areas AA1 and AA2 of the display panel 100. Thus, the degree of degradation of the display panel 100 is uniform as a whole and the image quality and the life-span of display device may be improved.

The drawing and the detailed description of the invention referred to above are descriptive sense only and are used for the purpose of illustration only and are not intended to limit the meaning thereof or to limit the scope of the invention described in the claims. Accordingly, a person having ordinary skill in the art will understand from the above that various modifications and other equivalent embodiments are also possible. Therefore, the real protective scope of the invention shall be determined by the technical scope of the accompanying claims.

What is claimed is:

1. A display device comprising:
a display panel including a first display area and a second display area adjacent to each other;
a processor which generates first image data corresponding to the first display area and the second display area in a first mode and second image data corresponding to the first display area or the second display area in a second mode; and
a display driver which generates a first data signal based on the first image data in the first mode and a second data signal based on the second image data in the second mode,
wherein one of the first display area and the second display area is alternately selected to display an image based on usage information of each of the first display area and the second display area, and the other of the first display area and the second display area not selected does not display an image so that degradation of the display panel is uniform throughout the first and second display areas,
wherein the second data signal is provided to a selected one of the first display area and the second display area at an entry time into the second mode, and
wherein the display driver includes an image converter which generates second conversion data by arranging the second image data based on area selection information corresponding to the selected one of the first display area and the second display area in the second mode, and the display panel displays a valid image only in the selected one of the first display area and the second display area, while the other non-selected one of the first display area and the second display area does not display any image.

2. The display device of claim 1, wherein the second data signal is provided to the selected one of the first display area and the second display area during the second mode is held continuously.

3. The display device of claim 1, wherein the first display area and the second display area are disposed continuously.

4. The display device of claim 1, wherein the display panel is a foldable display panel folded with reference to a folding axis, and
wherein the first display area and the second display area are divided with reference to the folding axis.

5. The display device of claim 4, wherein the display panel is out-folded with reference to the folding axis.

6. The display device of claim 5, wherein the processor operates in the first mode when the display panel is unfolded, and
wherein the processor operates in the second mode when the display panel is folded.

7. The display device of claim 5, further comprising
a sensor which senses a deformation of the display panel and outputs a sensing signal.

8. The display device of claim 1, wherein the display driver further includes:
an area selector which updates the area selection information based on the second image data or the second conversion data; and
a data driver which generates the first data signal based on the first image data and generates the second data signal based on the second image data while blocking an output corresponding to the other non-selected one of the first display area and the second display area,
wherein the area selection information includes a first setting value corresponding to the first display area and a second setting value corresponding to the second display area.

9. The display device of claim 8, wherein the area selector calculates accumulated data by accumulating the second image data, and changes the area selection information when an average of the accumulated data exceeds a first reference value, and
wherein the usage information corresponds to the accumulated data.

10. The display device of claim 9, wherein the area selector accumulates some of grayscale values included in the second image data to calculate the accumulated data.

11. The display device of claim 9, wherein the area selector initiates the accumulated data when entering or exiting the second mode.

12. The display device of claim 9, wherein the area selector adjusts the first reference value based on the accumulated data when entering or exiting the second mode, and
wherein the first reference value is larger as the accumulated data is larger.

13. The display device of claim 8, wherein the area selector changes the area selection information when a temporal change of the second image data is less than a reference value, and
wherein the usage information corresponds to a degree of change of the second image data.

14. A display device comprising:
a display panel including a first display area and a second display area adjacent to each other;
a processor which generates first image data corresponding to the first display area and the second display area in a first mode and second image data corresponding to the first display area or the second display area in a second mode; and
a display driver which generates a first data signal based on the first image data in the first mode and a second data signal based on the second image data in the second mode,
wherein one of the first display area and the second display area is alternately selected to display an image based on usage information of each of the first display area and the second display area, and the other of the first display area and the second display area not selected does not display an image so that degradation of the display panel is uniform throughout the first and second display areas,
wherein the second data signal is provided to a selected one of the first display area and the second display area at an entry time into the second mode,
wherein the display driver includes,
an image converter which generates second conversion data by arranging the second image data based on area selection information corresponding to the selected one of the first display area and the second display area in the second mode;

an area selector which updates the area selection information based on the usage information; and a data driver which generates the first data signal based on the first image data and generates the second data signal based on the second image data, wherein the area selection information includes a first setting value corresponding to the first display area and a second setting value corresponding to the second display area, wherein the area selector alternately selects the first setting value and the second setting value whenever entering the second mode, and wherein the usage information indicates whether each of the first and second display areas is used in a previous second mode.

15. The display device of claim 8, wherein the area selector generates first sub-accumulated data corresponding to the first display area and second sub-accumulated data corresponding to the second display area by accumulating the first image data and the second conversion data, and changes the area selection information based on a difference between the first sub-accumulated data and the second sub-accumulated data, and wherein the usage information of the first and second display area corresponds to the first and second sub-accumulated data.

16. The display device of claim 8, wherein the data driver blocks an output of a remaining one of the first display area and the second display area.

17. The display device of claim 1, further comprising
a first indicator corresponding to the first display area; and
a second indicator corresponding to the second display area, wherein the first indicator is activated when the first display area is selected, and wherein the second indicator is activated when the second display area is selected.

18. The display device of claim 17, wherein each of the first indicator and the second indicator is implemented as a lamp.

* * * * *